(12) United States Patent
Bahadra et al.

(10) Patent No.: US 9,043,737 B2
(45) Date of Patent: May 26, 2015

(54) INTEGRATED CIRCUIT DESIGN VERIFICATION THROUGH FORCED CLOCK GLITCHES

(71) Applicant: Freescale Semiconductor, Inc., Austin, TX (US)

(72) Inventors: Jayanta Bahadra, Austin, TX (US); Xiushan Feng, Austin, TX (US); Xiao Sun, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/873,655

(22) Filed: Apr. 30, 2013

(65) Prior Publication Data
US 2014/0325463 A1 Oct. 30, 2014

(51) Int. Cl.
*G06F 17/50* (2006.01)

(52) U.S. Cl.
CPC ........ *G06F 17/5031* (2013.01); *G06F 2217/84* (2013.01)

(58) Field of Classification Search
CPC .............. G06F 17/5081; G06F 17/505; G06F 17/5031; G06F 2217/78; G06F 2217/82; G06F 17/11
USPC ............... 716/108, 113–115, 134; 703/93–98
See application file for complete search history.

(56) References Cited

U.S. PATENT DOCUMENTS

| | | | |
|---|---|---|---|
| 6,543,027 B1 | 4/2003 | Hughes et al. | |
| 7,243,322 B1 * | 7/2007 | Ly et al. | 716/108 |
| 7,356,789 B2 * | 4/2008 | Ly et al. | 716/108 |
| 7,712,062 B2 * | 5/2010 | Ly et al. | 716/106 |
| 2007/0075746 A1 | 4/2007 | Fruhauf et al. | |
| 2011/0311017 A1 | 12/2011 | Baumeister et al. | |
| 2011/0317802 A1 | 12/2011 | Rohleder et al. | |

OTHER PUBLICATIONS

Mark Litterick, Using SystemVerilog Assertions in Gate-Level Verification Environments, DVCon2006.
Pranav Ashar and Vishnu Vimjam, Verifying complex clock and reset regimes in modern chips: the challenge and scalable solutions, EDN Network 2011. http://www.edn.com/design/integrated-circuit-design/4363968/Verifying-complex-clock-and-reset-regimes-in-modern-chips-the-challenge-and-scalable-solutions.
Clifford E. Cummings, lock Domain Crossing (CDC) Design & Verification Techniques Using SystemVerilog, SNUG2008, http://www.sunburst-design.com/papers/CummingsSNUG2008Boston_CDC.pdf.

* cited by examiner

*Primary Examiner* — Nghia Doan
(74) *Attorney, Agent, or Firm* — Yudell Isisdore PLLC (57) ABSTRACT

A technique for determining whether an integrated circuit design is susceptible to glitches includes identifying storage elements in an original register-transfer level (RTL) file of the integrated circuit design and identifying clock signals for each of the storage elements in the original RTL file. The technique also includes generating respective assertions for each of the identified clock signals and identifying potential glitchy logic in respective clock paths for each of the identified clock signals. Finally, the technique includes inserting, at the potential glitchy logic, glitches in each of the respective clock paths of the original RTL file to provide a modified RTL file and executing an RTL simulation using the modified RTL file and the respective assertions.

20 Claims, 10 Drawing Sheets

INTEGRATED CIRCUIT DESIGN VERIFICATION THROUGH FORCED CLOCK GLITCHES

BACKGROUND

1. Field

This disclosure relates generally to integrated circuit design verification and, more specifically, to integrated circuit design verification through forced clock glitches.

2. Related Art

Verifying clock integrity of an integrated circuit (IC) design can be challenging. For example, timing requirements of edge-trigger devices (e.g., flip-flops) must be met and setup/hold times of edge-triggered devices must satisfy design requirements in order to prevent metastability, which may cause an IC, when fabricated, to behave incorrectly. Metastability, which is a special case of non-determinism, is a condition where a bi-stable state is neither '0' nor '1' for a period of time. Clock glitches may cause a circuit to violate timing requirements and trigger metastability. In general, increased circuit complexity and aggressive clock gating techniques make clock distribution prone to clock glitches. Traditionally, incorrect timing behaviour has normally only been visible at the gate-level or at the silicon-level. In general, when incorrect timing behaviour is not detected until the gate-level or the silicon-level, a large amount of resources have been wasted. Conventional register-transfer level (RTL) verification has not been able to detect clock glitch induced metastability, as conventional RTL verification is zero delay and has typically not implemented timing checks.

RTL is a design abstraction that models a synchronous digital IC in terms of the flow of digital signals (data) between hardware registers and the logical operations performed on those signals. RTL abstraction is used in hardware description languages (HDLs) to create high-level representations of an IC, from which lower-level representations and ultimately actual silicon can be derived. Design at the RTL stage is the typical practice in modern digital IC design. A synchronous random circuit includes two kinds of elements (i.e., registers and combinational logic). Registers (usually implemented as D flip-flops as an example) synchronize operation of a circuit to edges of a clock signal and are the only elements in the circuit that have memory properties. Combinational logic performs all the logical functions in the circuit and typically only includes logic gates (e.g., AND gates, NAND gates, OR gates, NOR gates, etc.). When designing digital ICs with an HDL, IC designs are engineered at a higher level of abstraction than a transistor-level or a gate-level. In HDLs, a designer declares the registers and describes the combinational logic by using constructs (e.g., if-then-else statements and arithmetic operations) that are familiar in programming languages. In general, RTL focuses on describing the flow of signals between registers.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

DETAILED DESCRIPTION

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. As may be used herein, the term 'coupled' includes a direct electrical connection between elements or components and an indirect electrical connection between elements or components achieved using one or more intervening elements or components.

A number of conventional approaches are known that attempt to detect glitches (some approaches address clock glitches and other approaches focus on data glitches attributable to clock domain crossings) in integrated circuit (IC) designs. Most conventional approaches to detecting glitches use counters and comparators to identify glitches. In general, clock domain crossing (CDC) solutions rely on CDC violations to identify potential glitches and rely on simulation to accurately report the violations. In general, conventional approaches to detecting glitches only work when a simulation run exercises a glitch, which requires effort to create a perfect scenario to activate/propagate glitch stimuli. No conventional glitch detection solutions provide an automatic solution with minimum simulation tests and complete coverage.

As a general rule, register-transfer level (RTL) verification is faster (as compared to gate-level verification) and is easier to debug (as compared to silicon-level validation) and can verify large IC designs relatively fast. Moreover, as the RTL verification environment is relatively mature, there are a reasonable number of available RTL verification tools. RTL verification may be initiated early in a design cycle, as soon as an RTL file is complete for an IC design. Detecting bugs via RTL verification can advantageously reduce down-stream costs as silicon re-spinning and gate re-layout can be avoided. According to the present disclosure, clock glitches in IC designs may be discovered during RTL verification using a modified RTL file and assertions, which are checkers that can be used to verify partial and complete design behaviours. In general, a modified RTL file includes one or more glitch insertion circuits that are configured to insert high-frequency glitches at circuit locations that are susceptible to clock glitches. Employing assertion-driven partitions may greatly reduce a state-space of design parameters.

According to one or more aspects of the present disclosure, a technique for determining whether an integrated circuit (IC) design is susceptible to glitches includes identifying storage elements (e.g., edge-triggered devices) in an original register-transfer level (RTL) file of the integrated circuit design and identifying clock signals for each of the storage elements in the original RTL file. The technique also includes generating respective assertions for each of the identified clock signals and identifying potential glitchy logic (i.e., logic that receives clock signals from different clock domains) in respective clock paths for each of the identified clock signals. Finally, the technique includes inserting, at the potential glitchy logic, glitches in each of the respective clock paths of the original RTL file to provide a modified RTL file and executing an RTL simulation using the modified RTL file and the respective assertions.

Figure 1:
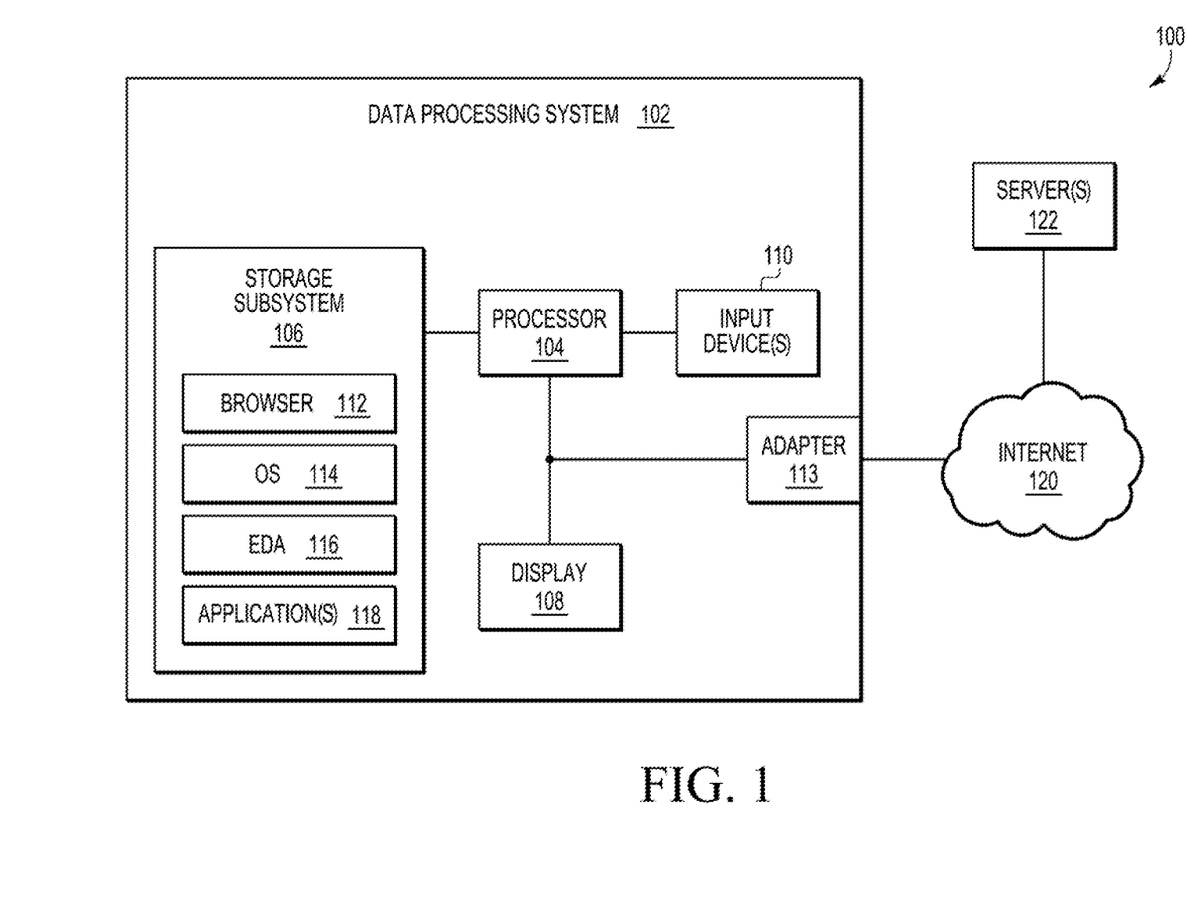
FIG. 1 is a block diagram of a relevant portion of an exemplary data processing system that executes electronic design automation (EDA) software configured to verify integrated circuit (IC) designs at a register-transfer level (RTL) through forced clock glitches according to the present disclosure.

With reference to FIG. 1, an exemplary processing environment 100 is illustrated that includes a data processing system 102 that is configured, according to one or more embodiments of the present disclosure, to verify an integrated circuit (IC) design (or portion of an IC design) through forced clock glitches. Data processing system 102 includes a processor 104 (which may include one or more processor cores) coupled to a storage subsystem 106, a display 108, one or more input devices 110, and an adapter 113. Storage subsystem 106 may include, for example, application appropriate amounts of memory (e.g., dynamic random access memory (DRAM), static RAM (SRAM), and/or read-only memory (ROM)), and/or one or more mass storage devices, such as magnetic media (tape or disk) drives and/or optical disk drives. Data processing system 102 may take on various forms, e.g., workstations, handhelds, laptop computer systems, notebook computer systems, or desktop computer systems and/or clusters of various computer systems.

As is illustrated, storage subsystem 106 includes an operating system (OS) 114 for data processing system 102. Storage subsystem 106 also includes application programs, such as a browser 112, one or more electronic design automation (EDA) tools 116 for simulating and verifying IC designs, and other applications (e.g., a word processing application, a presentation application, and an email application) 118.

Adapter 113 supports communication of data processing system 102 with one or more wired and/or wireless networks utilizing one or more communication protocols. Data processing system 102 is shown coupled via one or more wired or wireless networks, such as the Internet 120, to various file/web page servers 122 that provide information of interest to the user of data processing system 102. For example, servers 122 may provide various design files (e.g., RTL files) and/or design file libraries to data processing system 102. Input device(s) 110 of data processing system 102 may include, for example, a mouse and a keyboard. Display 108 may be, for example, a cathode ray tube (CRT) or a liquid crystal display (LCD). It should be appreciated that the hardware components and basic configuration depicted in FIG. 1 may vary and are not intended to be exhaustive, but are only representative.

Figure 2:
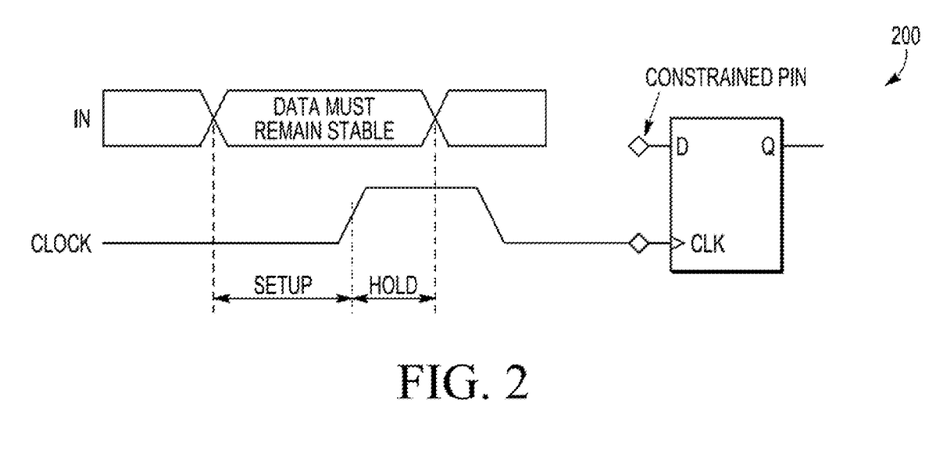
FIG. 2 is a timing diagram for an exemplary D flip-flop that illustrates setup and hold times for the D flip-flop.

With reference to FIG. 2, diagram 200 depicts setup and hold times for an exemplary D flip-flop (latch). It should be appreciated that violation of setup/hold times may trigger a metastable state for the D flip-flop. For an edge-triggered sequential device, the 'setup time' is the time interval before the active clock (CLK) edge during which data should remain unchanged and the 'hold time' is the time interval after the active clock edge during which data should remain unchanged. If the setup/hold times are not met (e.g., a clock signal has a glitch), the D flip-flop output (Q) is non-deterministic (i.e., the output can be a '0' or a '1') irrespective of the input to the D flip-flop.

Figure 3:
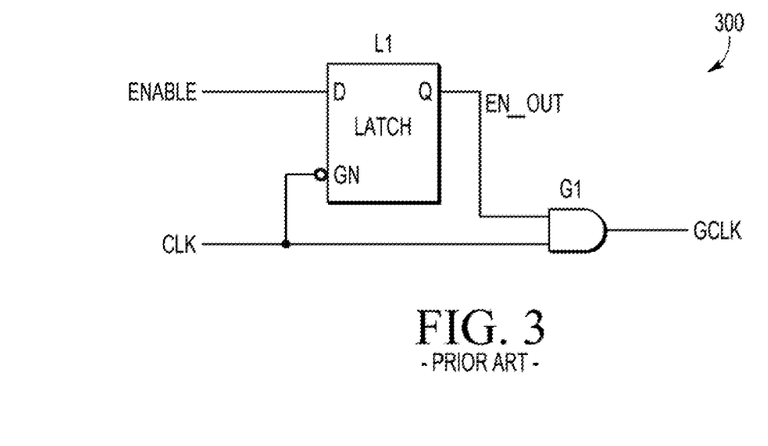
FIG. 3 is a diagram of a conventional clock gating logic that may be susceptible to clock glitches.

Clock gating is another possible source of clock glitches. A conventional clock gating logic 300 is illustrated in FIG. 3. Logic 300, which includes a latch (L1) and an AND gate (G1), may be implemented in an attempt to avoid clock glitches using the glitch prevention latch code illustrated below:

```
always @ (enable or clk) begin
    if !clk then en_out = enable // build latch
end
assign gclk = en_out && clk; // gate the clock
```

The code above attempts to prevent clock glitches by gating the clock signal 'CLK' using an enable signal 'ENABLE'. It should be appreciated that a clock glitch can still occur at 'GCLK' if the latch 'ENABLE' signal is not in proper synchronization with the 'CLK' signal domain.

Figure 4:
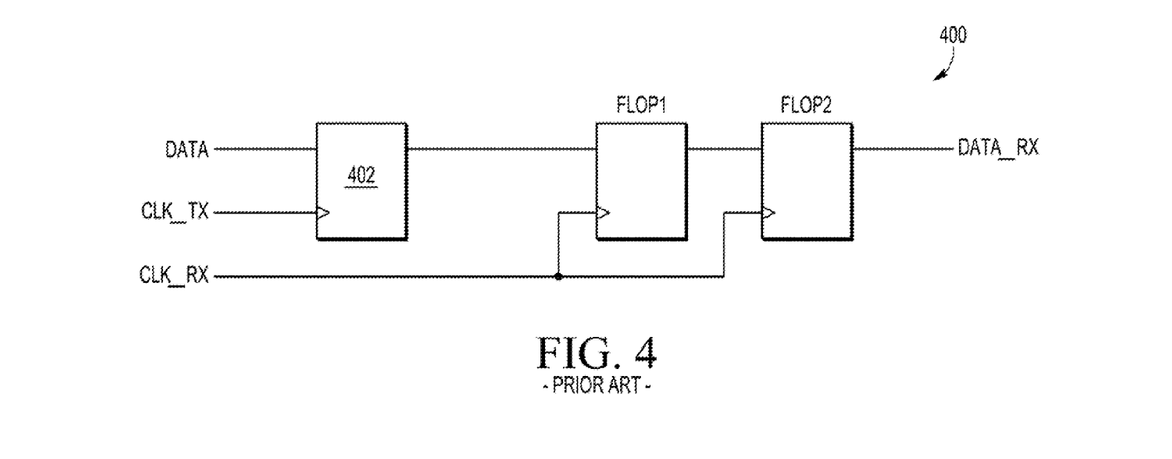
FIG. 4 is a diagram of a conventional clock domain synchronizer that may be susceptible to clock glitches.

With reference to FIG. 4, a conventional clock domain synchronizer 400 is illustrated that is configured to address clock glitches attributable to different clock domains (i.e., a transmit clock domain with a transmit clock signal 'CLK_TX' and a receive clock domain with a receive clock signal 'CLK_RX'). Synchronizer 400 includes two flip-flops in which a second flip-flop (FLOP2) chooses a value if a first flip-flop (FLOP1) is metastable. The synchronizer 400 has a one-cycle uncertainty in transition that depends on the implemented logic. In this case, an input of the synchronizer 400 (i.e., a 'DATA' port of latch 402) may receive data from a clock domain 'CLK_TX' that experiences clock glitches and provide, at an output of the synchronize 400, a data signal 'DATA_RX' that can be used by edge-trigger devices in the receive clock domain.

Figure 5:
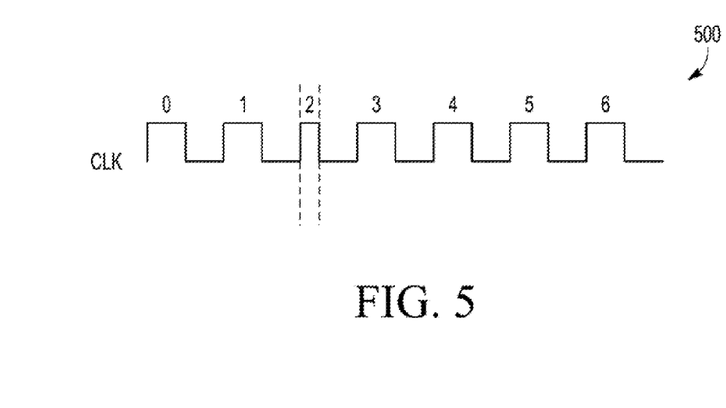
FIG. 5 is a diagram of a clock signal with a width of one of the clock pulses being altered to force a clock glitch.

It should be appreciated that a repeatable process for creating clock glitches, assuming a circuit is susceptible to clock glitches, is highly desirable. With reference to FIG. 5, one approach to detecting clock glitches employs a width-based assertion. For example, clock glitch assertion code for clock glitch initiation may be implemented as follows:

```
property glitch_det (clk, width);
    time start;
    @(clk)
        (1, start = $realtime) |=> ($realtime - start >= width);
endproperty
A1: assert property(glitch_det(clk_out, 0.5nS)); //frequency < 1Ghz
```

In the above code, a clock glitch having a desired width may be initiated using assertion 'A1'. In FIG. 5, the glitch in cycle two can be detected by the techniques disclosed herein. It should be appreciated that a width-based assertion in cycle two of the clock signal (CLK) 500 may (or may not) cause metastability depending on the circuit (i.e., depending on whether setup and/or hold times are violated). In general, conventional width-based assertion checks have limitations, as determining an appropriate width to initiate a glitch may not always be straight-forward.

According to the present disclosure, techniques are employed to force high-frequency glitches at locations that clock glitches are possible. In general, clock logic may or may not experience a glitch (i.e., clock glitches are stimuli dependent). According to various embodiments, known high-frequency glitches (e.g., 1 GHz glitches) are forced at locations that glitches are feasible. By forcing glitches at locations where glitches are feasible (i.e., at potential glitchy logic), the width of glitches is readily ascertained, e.g., by defining various assertions for each unique clock. In general, the location to force glitches is dependent on the clock logic cell (clock multiplexer, clock gater, synchronization cell, etc.).

Figure 6:
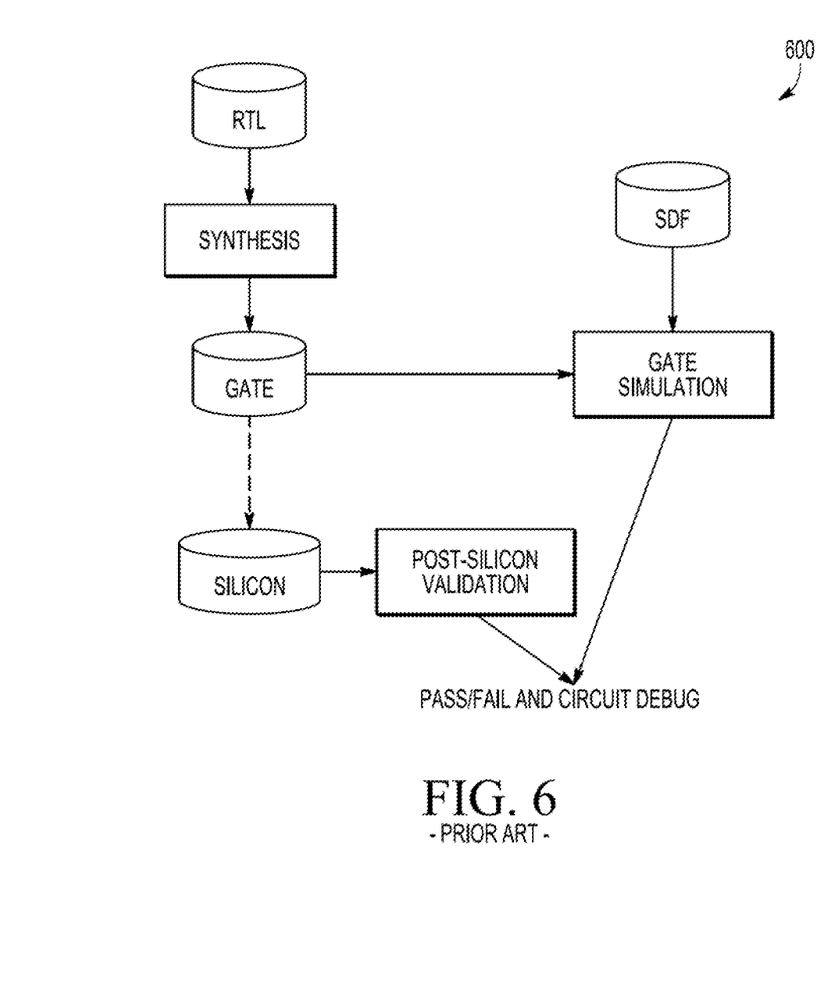
FIG. 6 is a schematic of a conventional process for determining whether a circuit under test has passed or failed the test and for performing circuit debug when the circuit fails the test.

With reference to FIG. 6, a conventional clock glitch detection environment 600 detects clock glitches late in a design cycle (e.g., during gate-level simulation or at the silicon-level using post-silicon validation). As is shown, a standard delay format (SDF) file, which is a file that is used to define delays inside a circuit, is used during gate-level simulation to simulate circuit delays. In the environment 600, a synthesis tool is utilized to convert an RTL file into a gate-level file, which may then be implemented in silicon that undergoes a post-silicon validation.

Figure 7:
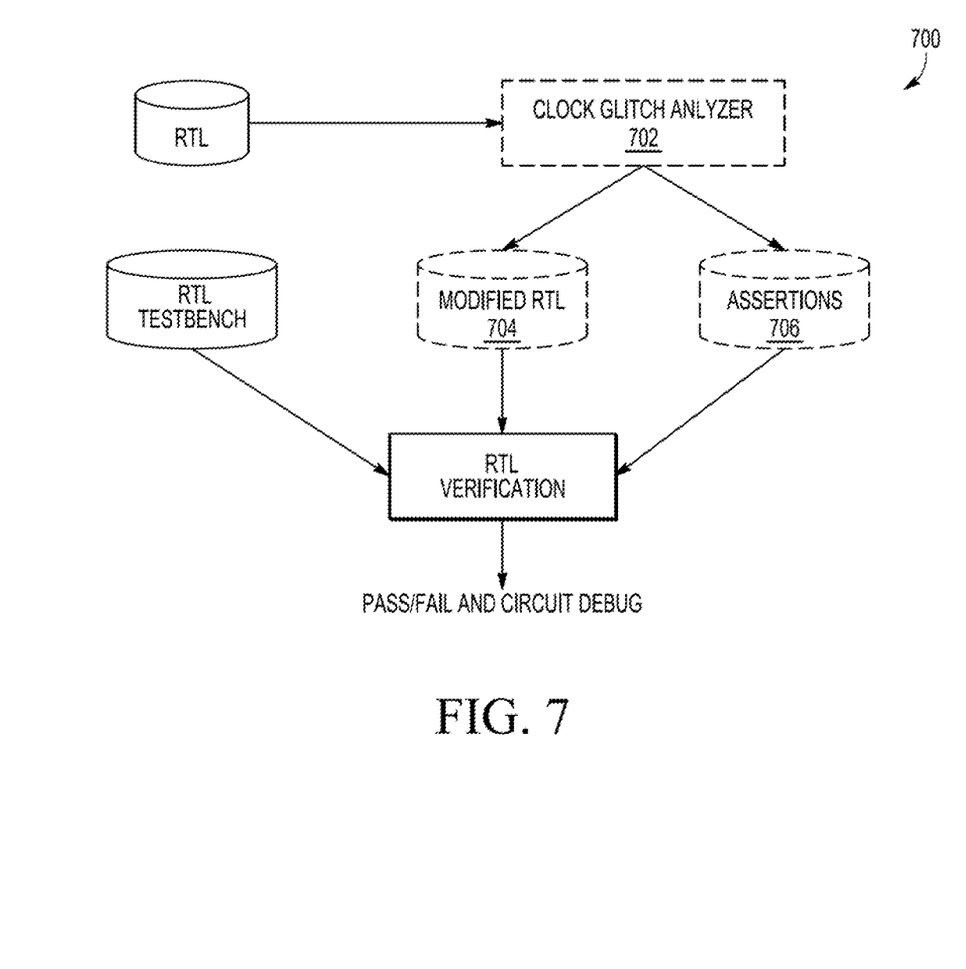
FIG. 7 is a schematic of components (including a clock glitch analyzer, a modified RTL file, and assertions file) for determining whether a circuit under test has passed or failed the test and for performing circuit debug when the circuit fails the test according to the present disclosure.

With reference to FIG. 7, according to an embodiment of the present disclosure, a clock glitch detection environment 700 implements a clock glitch analyzer 702 that employs a number of unique clocks that drive edge-trigger devices in an IC design, with each clock of the unique clocks driving a different groups of devices. The clock glitch analyzer 702 is utilized to generate a modified RTL 704 and an assertions file 706, which are used during RTL verification to determine whether an IC design is susceptible to clock glitches.

Figure 8:
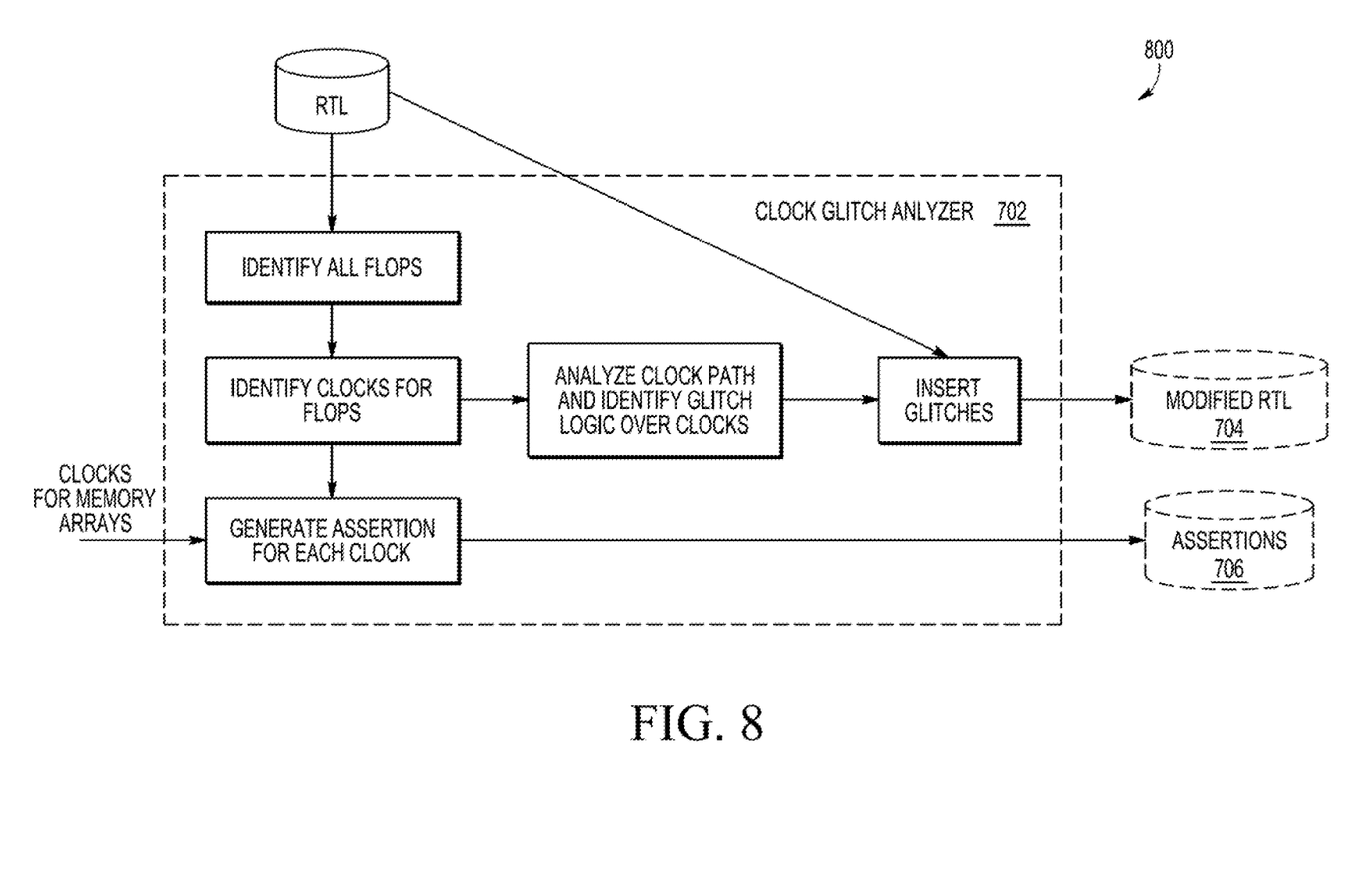
FIG. 8 is a more detailed diagram of the clock glitch analyzer of FIG. 7.
Figure 9:
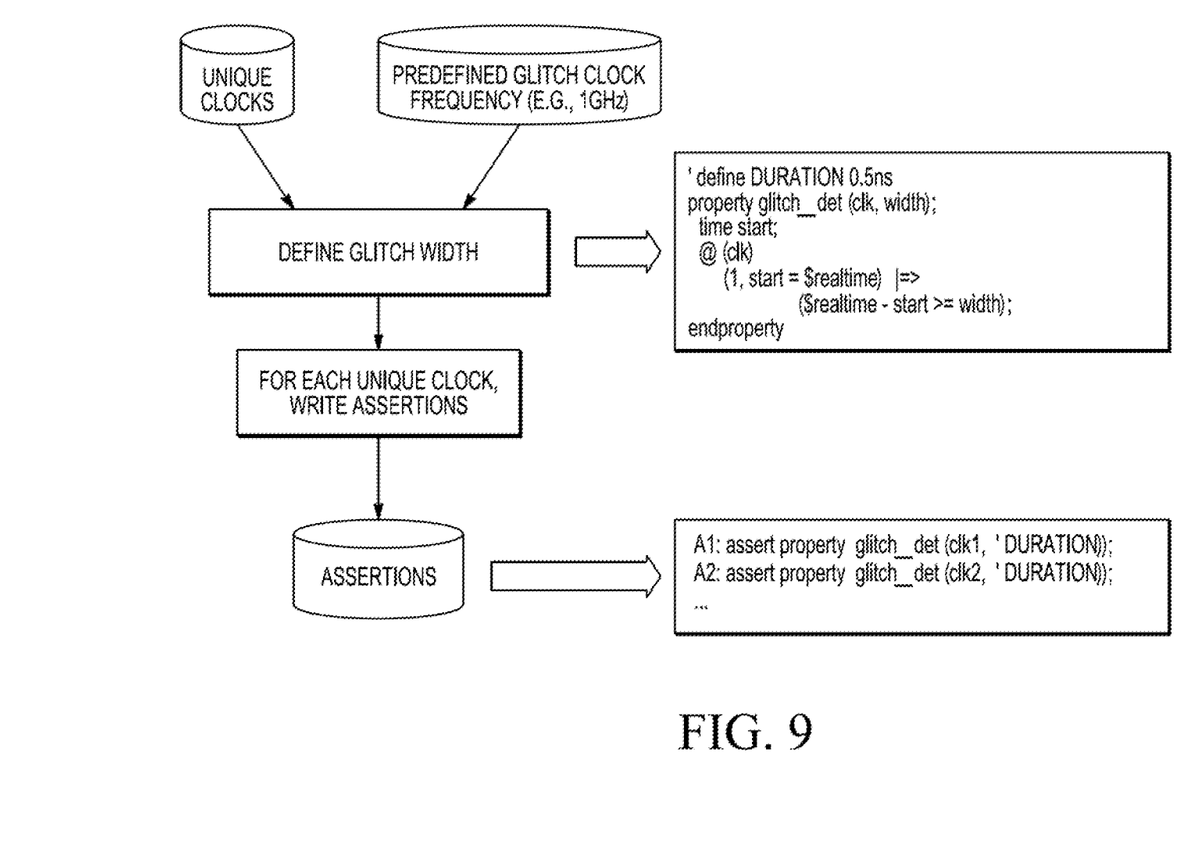
FIG. 9 is a diagram of components for creating assertions according to the present disclosure.

With reference to FIG. 8, according to an embodiment of the present disclosure, an environment 800 illustrates that the clock glitch analyzer 702 identifies all flip-flops in the IC design and identifies clocks for the flip-flops. The clock glitch analyzer 702 then generates assertions for each clock. The generated assertions (each of which may correspond to different widths for different clocks) are then stored in the assertions file 706. The clock glitch analyzer 702 also analyzes clock paths for the identified clock signals to identify potential glitchy logic (i.e., logic that receives clock signals from different clock domains) associated with the clock signals. The clock glitch analyzer 702 then inserts glitches (i.e., glitch logic see FIG. 12) in an original RTL file where potential glitchy logic is indicated to provide the modified RTL 704. With reference to environment 900 of FIG. 9, assertion generation is implemented by defining a glitch width (e.g., 0.5 nS). For example, code for defining a glitch width may be given by:

```
define DURATION 0.5ns
    property glitch_det (clk, width);
        time start;
        @(clk)
            (1, start = $realtime) |=>
                ($realtime - start >= width);
    endproperty
```

In the above code, a duration 'width' of a glitch for a clock signal 'clk' is defined with respect to a start time of the clock signal. Various assertions for each unique clock signal may then be defined as follows:

```
A1: assert property(glitch_det(clk1, `DURATION));
A2: assert property(glitch_det(clk2, `DURATION));
...
```

Figure 10:
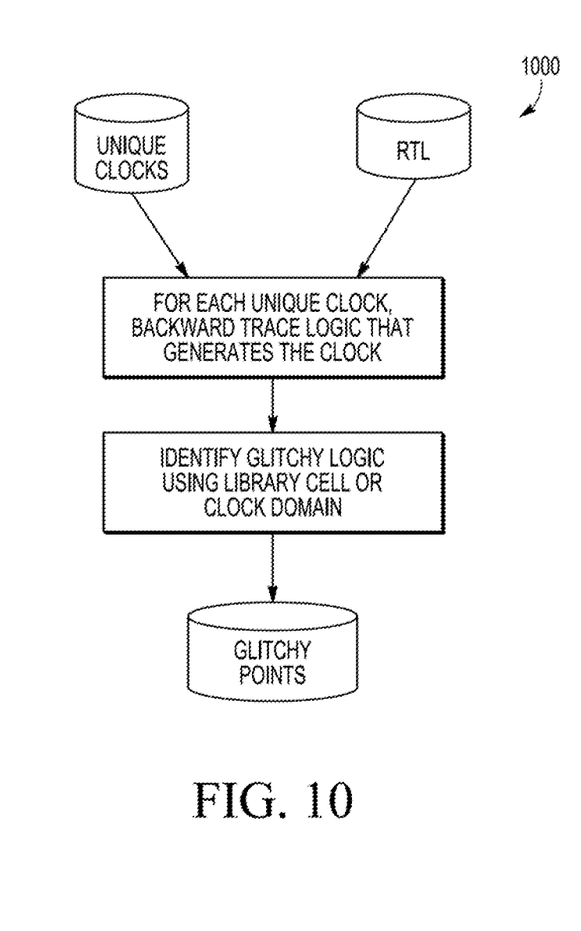
FIG. 10 is a diagram of components for detecting potential glitchy logic (i.e., logic susceptible to clock glitches) according to the present disclosure.
Figure 11:
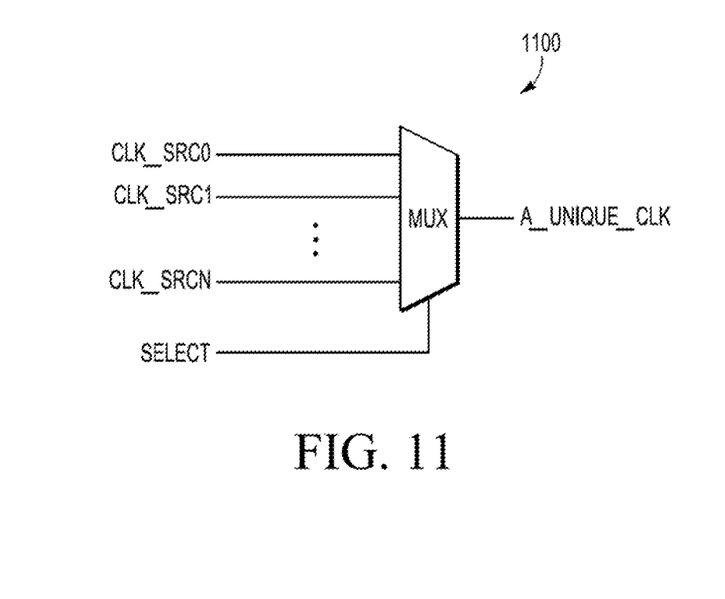
FIG. 11 is a diagram of an exemplary multiplexer that selects one of a plurality of clocks for providing a unique clock signal.

With reference to FIGS. 10 and 11, environment 1000 evaluates a path of each unique clock to identify glitchy logic (i.e., logic that receives clock signals from different clock domains). For example, by backward tracing a clock signal (e.g., 'A_UNIQUE_CLK') of multiplexer (MUX) 1100 to when the signal hits the multiplexer 1100 an RTL verification tool can find a 'select' signal that is from a different clock domain. In this case, a glitch is possible at the output of the multiplexer 1100 when the 'select' signal selects a different input clock signal (from among signals CLK_SRC0, CLK_SRC1, . . . CLK_SRCN). Using a cell-based solution allows for predefining cells (clock-multiplexer cells, clock gater cells without latch enable, etc.) that may experience glitches. The tool can then initiate locating the cells to identify potential glitchy points.

Figure 12:
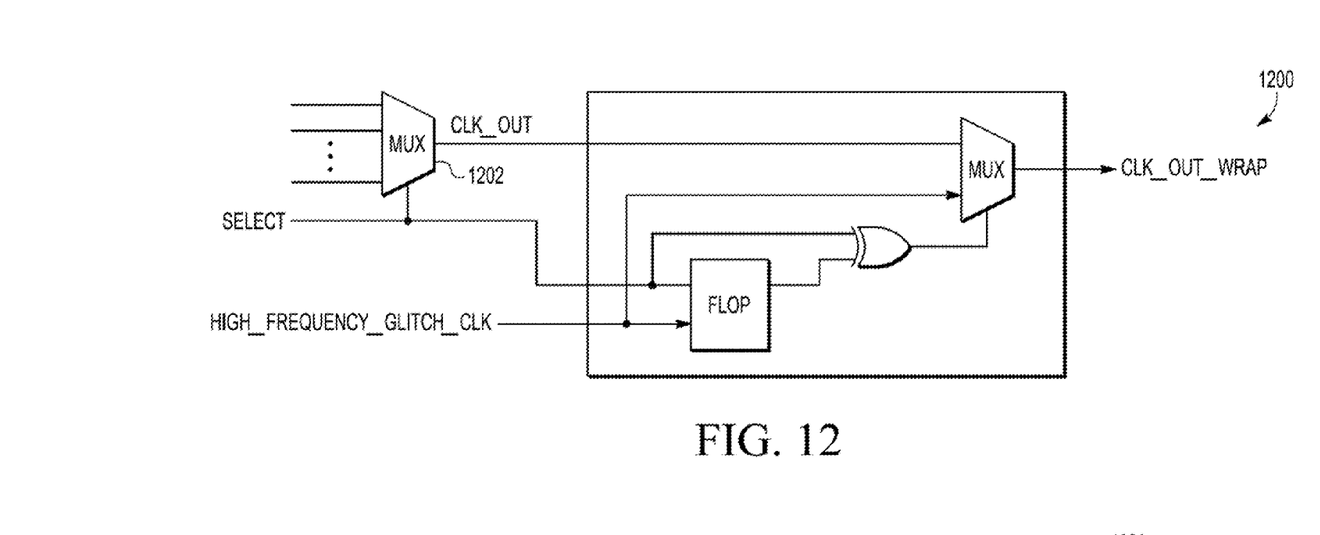
FIG. 12 is a diagram of an exemplary glitch insertion circuit, configured according to the present disclosure, for inserting a high-frequency glitch at an output of a clock multiplexer cell.

With reference to FIG. 12, an exemplary glitch insertion circuit 1200 for inserting a high-frequency glitch (HIGH_FREQUENCY_GLITCH_CLK) at an output of a clock multiplexer cell 1202 is illustrated. An RTL file can be modified to insert glitches as follows:

```
`ifdef GLITCH_DET
    always @(posedge high_frequent_glitch_clk)
        select_pre <= select;
    assign f_select = select_pre ^ select;
    always @(*)
        case (f_select)
            0:clk_out_wrap = clk_out;
            1:clk_out_wrap = high_frequent_glitch_clk;
            default: clk_out_wrap = high_frequent_glitch_clk;
        endcase
`else
    asssign clk_out_wrap = clk_out;
`endif
```

In the above code, a non-original input clock 'high_frequency_glitch_clock' replaces an output clock 'clk_out' when a select signal 'f_select' changes to insert a glitch. For the clock multiplexer 'MUX' of FIG. 12, whenever a select signal 'SELECT' of the multiplexer 'MUX' changes one or more glitches are generated using a non-original high-frequency clock (HIGH_FREQUENCY_GLITCH_CLK) whose frequency and width are selected to insert a glitch. In this case, the 'CLK_OUT_WRAP' signal replaces 'CLK_OUT' inside the original circuit.

The disclosed techniques may be differentiated from clock domain crossing (CDC) checks in a number of ways. In general, CDC checks implement static or dynamic simulation based solutions that detect metastability when signals from one clock domain drive logic of a different clock domain.

However, most CDC tools only check a data path using static analysis. While CDC simulation may be implemented at the RTL, CDC simulation cannot detect clock glitches. Moreover, if CDC runs at the gate-level with SDF, CDC relies on the test bench (e.g., to change a select pin during a certain time range to generate a glitch or to select a glitchy clock as the output). In general, considerable effort is required to define clock domains and many false warnings may be generated by CDC tools. That is, CDC tools may generate many false failures that require manpower to address the false failures.

Figure 13:
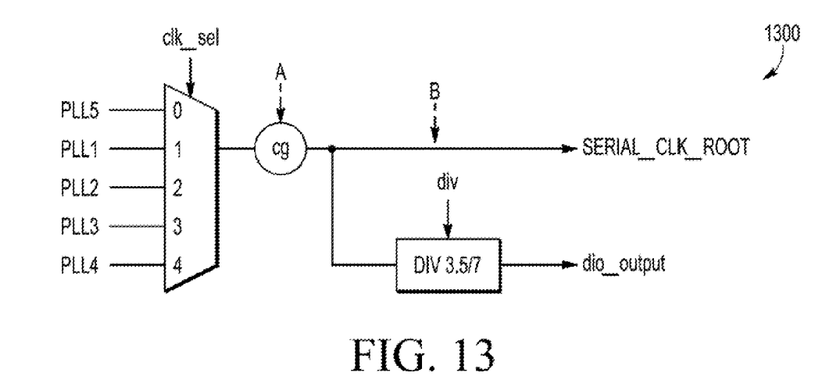
FIG. 13 is a diagram of an exemplary clock gate.
Figure 14:
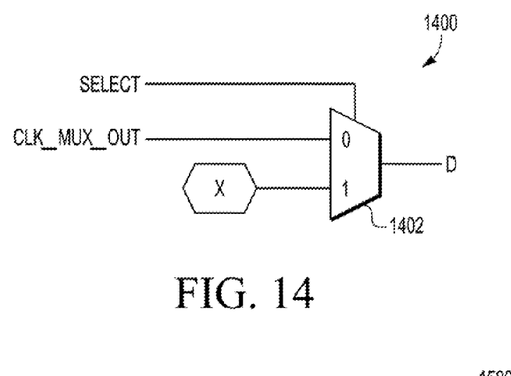
FIG. 14 is a schematic of an exemplary clock gate and test circuitry that is configured to provide clock glitches at an output of the clock gate responsive to a select signal.
Figure 15:
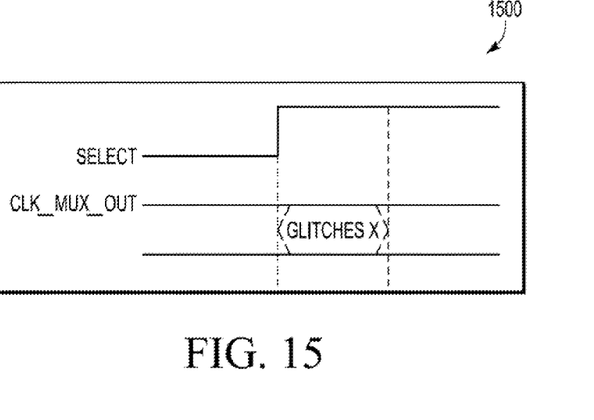
FIG. 15 is a timing diagram illustrating the insertions of clock glitches in a circuit.

The disclosed techniques facilitate the detection of clock glitches, have minimum test bench requirements (e.g., as long as a select pin changes values), and may be configured to run an RTL verification in a fully-automatic mode. When an assertion fails, a bug in an IC design is indicated. In general, a single RTL verification, according to the present disclosure, is capable of exposing all bugs related to clock glitches. For example, an RTL verification, according to the present disclosure, can detect critical bugs that cause dead clock domains at the silicon-level. With reference to FIG. 13, a multiplexer of circuit 1300 includes five phase-locked loop (PLL) inputs, i.e., PLL1-PLL5. If a clock gate (CG) is implemented at position 'B' (instead of position 'A') in the circuit 1300, a glitch attributable to the selection of 'PLL1' by the multiplexer may be driven to the 3.5/7 divider, which may cause the divider to enter an unrecoverable state. When this issue occurs, the signal 'SERIAL_CLK_ROOT' is alive while the signal 'DIO_OUTPUT' is dead. With reference to FIGS. 14 and 15, with respect to circuit 1400 and associated timing diagram 1500, when a clock glitch is forced on multiplexer 1402, a clock glitch will be detected when the multiplexer 1402 is susceptible to clock glitches. According to aspects of the present disclosure, glitches are forced on potentially glitchy multiplexers to ensure that glitches are detected. In the test bench, whenever the select signal changes, glitches are inserted.

As noted above, assertions for unique clocks are automatically generated using a clock glitch analyzer (which provides one-hundred percent checking coverage). The assertions, which are automatically activated, provide pre-defined glitches to ensure glitch activation in susceptible logic. Modified RTLs are used to provide automatically generated glitches for potential glitchy devices. In general, the disclosed techniques reduce verification efforts, improve verification quality, reduce product time-to-market and yield higher quality products.

Figure 16:
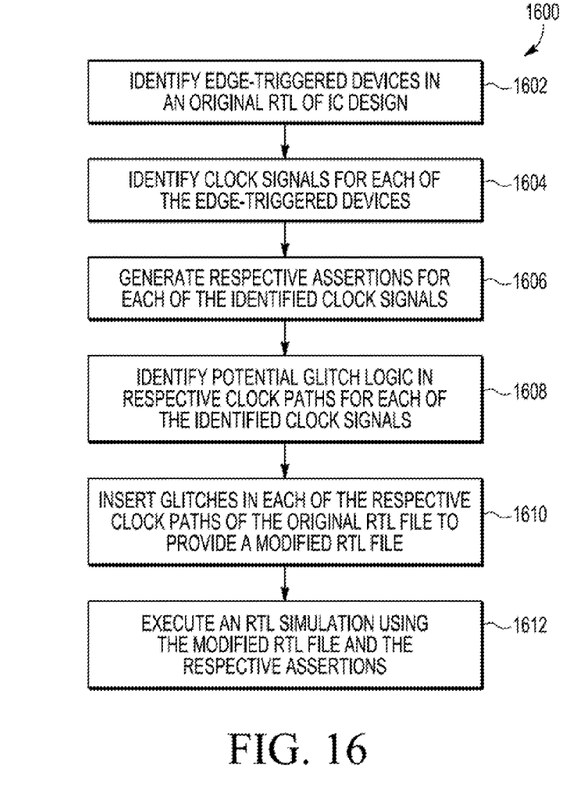
FIG. 16 is a flowchart of a process for verifying IC designs through forced clock glitches according to the present disclosure.

With reference to FIG. 16, a process 1600 is illustrated that verifies an integrated circuit (IC) design through forced clock glitches. The process 1600 determines whether an IC design is susceptible to glitches. The process 1600 is initiated, e.g., by processor 104, in block 1602 (e.g., in response to a user of data processing system 102 initiating EDA tool 116). In block 1602, processor 104 identifies edge-triggered devices in an original register-transfer level (RTL) file of the IC design. Next, in block 1604, processor 104 identifies clock signals for each of the edge-triggered devices in the original RTL file. Then, in block 1606, processor 104 generates respective assertions for each of the identified clock signals. Next, in block 1608, processor 104 identifies potential glitchy logic in respective clock paths for each of the identified clock signals. Then, in block 1610, processor 104 inserts glitches in each of the respective clock paths of the original RTL file to provide a modified RTL file. Finally, in block 1612, processor 104 executes an RTL verification using the modified RTL file and the respective assertions. In the event the RTL verification fails, process 1600 provides various information that allows a designer to determine what modifications to initiate in the IC design to address the failure.

Accordingly, techniques have been disclosed herein that advantageously determine whether an integrated circuit (IC) design is susceptible to glitches using a modified register-transfer level file and design appropriate assertions that automatically force clock glitches on potentially glitchy logic of the IC design.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method of determining whether an integrated circuit design is susceptible to glitches, comprising:
    identifying, using a data processing system, storage elements in an original register-transfer level (RTL) file of the integrated circuit design;
    identifying, using the data processing system, clock signals for each of the storage elements in the original RTL file;
    generating, using the data processing system, respective assertions for each of the identified clock signals;
    identifying, using the data processing system, potential glitchy logic that receives at least two of the identified clock signals (a) from different clock domains and (b) in respective clock paths;
    inserting, using the data processing system, at the potential glitchy logic, clock glitches in each of the respective clock paths of the original RTL file to provide a modified RTL file;
    executing, using the data processing system, an RTL simulation using the modified RTL file and the respective assertions;
    determining if the integrated circuit design passed or failed the RTL simulation; and
    providing a physical integrated circuit if the integrated circuit design passed the RTL simulation.

2. The method of claim 1, wherein the storage elements devices are flip-flops.

3. The method of claim 1, wherein at least two of the respective assertions set a duration for each of the identified clock signals that is based on a clock frequency.

4. The method of claim 1, wherein the identifying potential glitchy logic in respective clock paths for each of the identified clock signals includes using a backward trace approach.

5. The method of claim 1,
    wherein the identifying potential glitchy logic in respective clock paths for each of the identified clock signals includes using a library cell-based approach; and
    wherein the cell-based approach identifies clock multiplexer cells and clock gate cells that do not include latch enable signals.

6. The method of claim 1, wherein the generating, using the data processing system, the respective assertions for each of the identified clock signals includes generating at least an assertion of the assertions that utilizes a duration of a clock peak of the identified clock signal, independent of a frequency of the identified clock signal.

7. The method of claim 1, wherein providing the physical integrated circuit includes fabricating the physical integrated circuit in a semiconductor substrate.

8. A computer program product, comprising:
   a storage device; and
   executable code embodied on the storage device, wherein the code, when executed by a processor, the processor:
      identifies edge-triggered devices in an original register-transfer level (RTL) file of the integrated circuit design;
      identifies clock signals for each of the edge-triggered devices in the original RTL file;
      generates respective assertions for each of the identified clock signals;
      identifies potential glitchy logic that receives at least two of the identified clock signals from (a) different clock domains and (b) in respective clock paths;
      inserts, at the potential glitchy logic, clock glitches in each of the respective clock paths of the original RTL file to provide a modified RTL file;
      executes an RTL simulation using the modified RTL file and the respective assertions;
      determines if the integrated circuit design passed or failed the RTL simulation; and
      provides a physical integrated circuit if the integrated circuit design passed the RTL simulation.

9. The computer program product of claim 8, wherein the edge-triggered devices are flip-flops.

10. The computer program product of claim 8, wherein at least two of the respective assertions set a duration for each of the identified clock signals that is based on clock frequency.

11. The computer program product of claim 8, wherein when the processor identifies the potential glitchy logic in respective clock paths for each of the identified clock signals, the processor further utilizes a backward trace approach.

12. The computer program product of claim 8,
   wherein when the processor identifies the potential glitchy logic in respective clock paths for each of the identified clock signal, the processor further utilizes a library cell-based approach; and
   wherein the cell-based approach identifies clock multiplexer cells and clock gate cells that do not include latch enable signals.

13. The compute program product of claim 8, wherein when the processor generates respective assertions for each of the identified clock signals, the processor generates at least an assertion of the assertions that utilizes a duration of a clock peak of the identified clock signal, independent of a frequency of the identified clock signal.

14. The computer program product of claim 8, wherein when the processor provides the physical integrated circuit if the integrated circuit design passed the RTL simulation, the processor instructs a fabrication system that fabricates the physical integrated circuit in a semiconductor substrate.

15. A data processing system, comprising:
   a memory that includes instructions; and
   a processor coupled to the memory, wherein as the processor executes the instructions, the processor:
      identifies edge-triggered devices in an original register-transfer level (RTL) file of the integrated circuit design;
      identifies clock signals for each of the edge-triggered devices in the original RTL file;
      generates respective assertions for each of the identified clock signals;
      identifies potential glitchy logic that receives at least two of the identified clock signals (a) from different clock domains and (b) in respective clock paths;
      inserts, at the potential glitchy logic, clock glitches in each of the respective clock paths of the original RTL file to provide a modified RTL file;
      executes an RTL simulation using the modified RTL file and the respective assertions;
      determines if the integrated circuit design passed or failed the RTL simulation; and
      provides a physical integrated circuit if the integrated circuit design passed the RTL simulation.

16. The data processing system of claim 15, wherein the edge-triggered devices are flip-flops.

17. The data processing system of claim 15, wherein at least two of the respective assertions set a duration for each of the identified clock signals that is based on clock frequency.

18. The data processing system of claim 15, wherein when the processor identifies the potential glitchy logic in respective clock paths for each of the identified clock signals, the processor further utilizes a backward trace approach.

19. The data processing system of claim 15, wherein when the processor generates respective assertions for each of the identified clock signals, the processor generates at least an assertion of the assertions that utilizes a duration of a clock peak of the identified clock signal, independent of a frequency of the identified clock signal.

20. The data processing system of claim 15, wherein when the processor provides the physical integrated circuit if the integrated circuit design passed the RTL simulation, the processor instructs a fabrication system that fabricates the physical integrated circuit in a semiconductor substrate.

* * * * *

UNITED STATES PATENT AND TRADEMARK OFFICE
CERTIFICATE OF CORRECTION

PATENT NO. : 9,043,737 B2
APPLICATION NO. : 13/873655
DATED : May 26, 2015
INVENTOR(S) : Jayanta Bhadra It is certified that error appears in the above-identified patent and that said Letters Patent is hereby corrected as shown below:

Title Page

Page 1 of Issued Patent: Correct Spelling of First Inventor from Jayanta Bahadra to Jayanta Bhadra Signed and Sealed this
Sixth Day of October, 2015

Michelle K. Lee
*Director of the United States Patent and Trademark Office*